Dec. 29, 1970   D. C. HARER   3,550,367
ROTARY CUTTING DEVICE FOR A HARVESTING MACHINE
Filed April 1, 1968
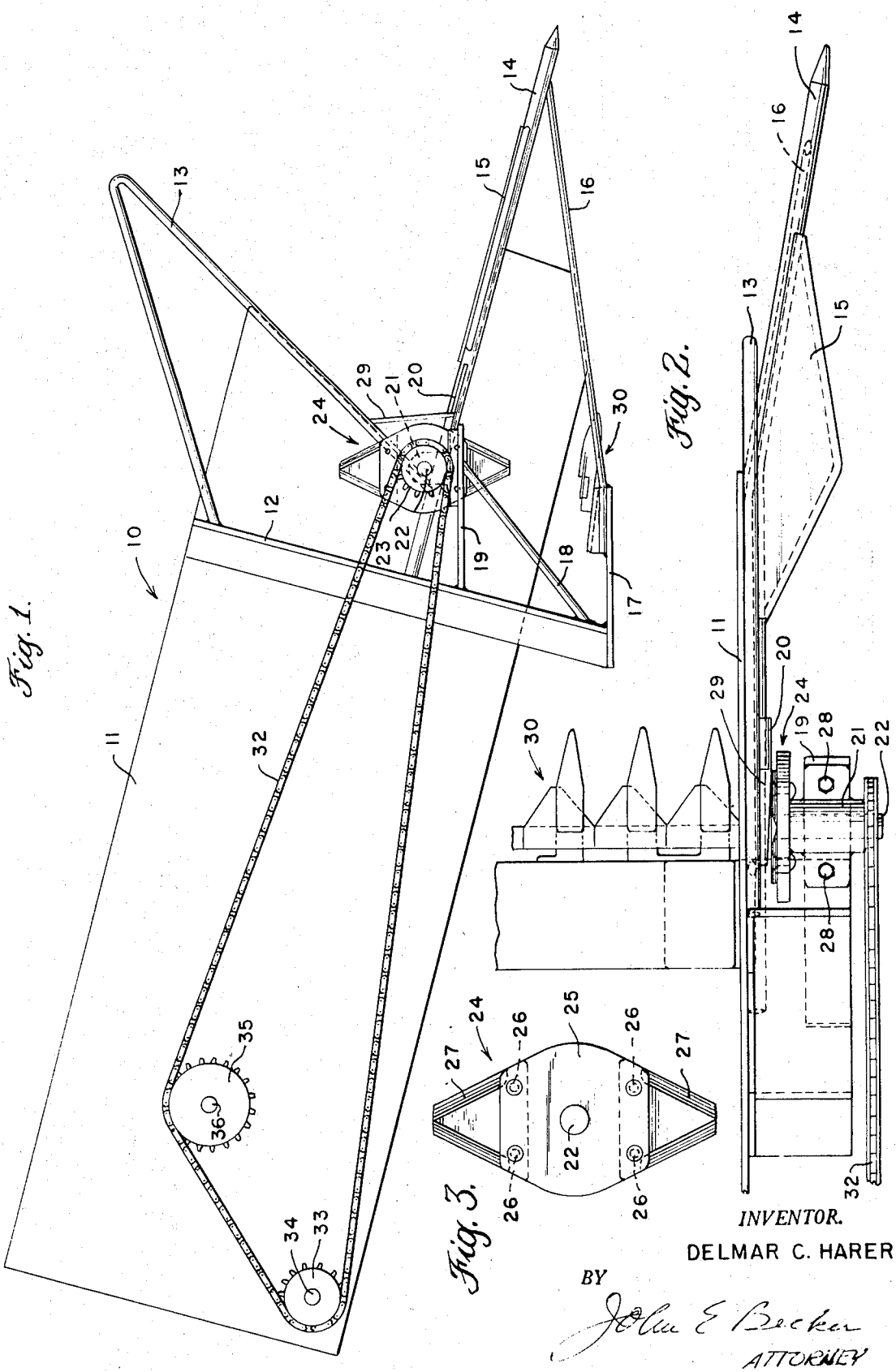
INVENTOR.
DELMAR C. HARER
BY
*John E. Becker*
ATTORNEY

United States Patent Office 3,550,367
Patented Dec. 29, 1970

3,550,367
ROTARY CUTTING DEVICE FOR A HARVESTING MACHINE
Delmar C. Harer, New Holland, Pa., assignor to Sperry Rand Corporation, New Holland, Pa., a corporation of Delaware
Filed Apr. 1, 1968, Ser. No. 717,542
Int. Cl. A01d 63/00
U.S. Cl. 56—315                                    3 Claims

ABSTRACT OF THE DISCLOSURE

A rotary cutting device for a harvesting machine wherein a rotary cutting device is mounted on a substantially vertical side wall of a harvesting machine header, adjacent a crop dividing means also connected to the header, so as to be able to cut crop material tending to clog at the end of a sickle means, extending across the header, and aid a crop divider means in separating the cut from the uncut material as the machine passes through dense or viney crop material.

BACKGROUND OF THE INVENTION

This invention relates generally to a cutting device for harvesting machines, and specifically to a rotary cutting device mounted on a harvesting machine header which device is adapted to cooperate with the crop divider means to provide for a clean cut through crop material and to prevent clogging of a sickle means also disposed in the header.

When using a harvesting machine, such as the machine shown in U.S. Pat. No. 3,293,835, Gehman et al., it has been found that under certain limited conditions crop material may tend to build up on the outside of the crop divider to an extent that it is no longer capable of performing the function of marking the track of travel, especially when the crop material is thick or dense, or it has been beaten down by a heavy rain, or the like, or the crop is viney by nature. This objectional bunching of material on the crop divider causes uneven feeding of the crop material to the sickle means of the harvesting machine. The uneven feeding of the material causes intermittent bunching at the sickle causing overloading and may lead to eventual breakage.

Certain prior art attempts have been made to alleviate this problem, but these attempts have not always proved successful. Previously available devices constructed to alleviate this clogging problem have employed, for example, reciprocating cutting elements, mounted vertically on a header wall, driven from the reciprocating sickle means disposed beneath the header on the harvesting machine. In employing such a device, it was necessary to provide a substantial amount of hardware to assure ample support and to supply reciprocating movement to the cutter during its operation. Because the vertical auxiliary cutter was driven from the main sickle means, it necessarily meant an additional load was placed on the sickle, increasing the wear characteristics and normal vibrational characteristics which were imparted during operation thereof. Further, if the auxiliary reciprocating cutting device became overloaded to a point where it was no longer operable, it meant that the main sickle of the machine also was rendered inoperable because of the driving interconnection.

SUMMARY OF THE INVENTION

Accordingly, the present invention will alleviate problems previously encountered using available auxiliary cutting means by providing a simple rotary cutting device mounted on a harvesting machine header and driven directly from the harvesting machine power source, rather than from the main reciprocating sickle means of the machine.

DESCRIPTION OF THE DRAWINGS

FIG. 1 is a side elevational view of the rotary cutting device for a harvesting machine constructed in accordance with the present invention.

FIG. 2 is an enlarged fragmentary plan view of FIG. 1.

FIG. 3 is a detailed view of the rotary cutting device.

Referring now to FIG. 1 of the drawings, a header member for a forage harvesting machine is generally indicated by the numeral 10. The header 10 is comprised in part, of a flat substantially vertical side sheet 11, of a suitable metal stock material, an angle iron 12 suitably fastened by means not shown, adjacent the forward end of header 10 to side sheet 11, a triangular guard member 13, of suitable bar stock, a generally outwardly and downwardly extending bar stock guard member 14, having a slight outward bend intermediate the ends threeof, a combining means 15 fixed to guard 14, a brace member 16 fastened by one end adjacent the end of guard 14 and by the other end to a plate or ground engaging skid member 17 fixed to the bottom of angle arm 12 and extending outwardly therefrom, a brace 18, and a bearing support 19. Guard member 13 is affixed by one end adjacent the upper end of angle iron 12 and by the other end to guard member 14, intermediate the ends thereof, so that a V is formed between the upper guard member 13 and the horizontally extending guard member 14, as shown in FIG. 1. Bearing support 19 is a substantially flat plate affixed by one end by welding, or the like to angle arm 12 and extending horizontally outwardly therefrom. The brace 18 extends from a point adjacent the bottom of angle arm 12, where it is fixed thereto, to a point intermediate of the ends of bearing support 19. A shear bar 20 is connected by a suitable means not shown to guard member in the area adjacent the point of the V, forwardly of a V-shaped guard plate suitably secured by means not shown to guard members 13 and 14, illustrated in FIG. 1.

A bearing member 21 is suitably fastened to the bearing support 19 by means of bolts 28, as shown in FIGS. 1 and 2. Rotatably supported within the bearing 21 is a shaft element 22 having a sprocket 23 fixed to the outer end thereof and a rotary cutter means 24 fixed to the inner end thereof, as shown in FIGS. 1 and 2. Both the sprocket 23 and the rotary cutter means 24 are adapted to rotate with the shaft 22. The rotary cutter means 24 is positioned adjacent the shear bar 20 and cooperates therewith, as will hereinafter be described in detail. The rotary cutter means is comprised of a plate portion 25 having a centrally disposed aperture therein for receipt of shaft member 22, as shown in FIG. 3. The plate is provided with generally flat end and rounded edge portions, with a pair of cutter blades 27 being fixed to the flat end portions by fastening means 26.

A conventional sickle means 30 is mounted forwardly of the header element 10 and extends across the header in a conventional manner, as shown in FIGS. 1 and 2. The sickle means 30 is powered by reciprocating movement in a conventional manner by means not shown.

The rotary cutter means is powered by a chain 32 which is driven over sprocket 23 by means of a driving sprocket 33 rotatably mounted on shaft 34. Shaft 34 is driven from a suitable power source of the harvesting machine (not shown), such as a tractor power take-off or a self propelling engine on the machine. Chain 32 is disposed on the outside of side sheet 11 and is driven between sprockets 33, 23, and idler 35, rotatably mounted on shaft 36, as shown in FIG. 1.

In operation, as a harvesting machine having a header with a rotary cutting attachment suitably positioned thereon is moved through a field of crop material, the rotary cutter device makes a vertical cut in dense, bent over, or viney crops to better divide the material as the machine passes through. The converging guard members serve to guide the crop vertically into the front sector of the rotary cutter assembly where cutting takes place because of the velocity of the rotating cutter and the cooperation of the cutter and the shear bar as is well known in the art. The improved construction reduces clogging at the outer end of the sickle means which may occur when the crop material has been bent down because of heavy rains or the like, or which also may happen because the crop material is dense or of a binding nature.

While this invention has been described in connection with a particular embodiment thereof, it will be understood that it is capable of modification, and this application is intended to cover any variations, uses, or adaptations following, in general, the principles of the invention and including such departures from the present invention as come within the known or customary practice in the art to which the invention pertains, and as fall within the scope of the invention or the limits of the appended claims.

I claim:

1. A rotary cutting device for a crop harvesting machine comprising in combination: a header member having a horizontal sickle means extending thereacross forwardly of said harvesting machine; a divider means mounted generally to one side of said header member and extending forwardly therefrom, said divider means including a first bar mounted to said header member and extending generally downwardly and forwardly therefrom to a point intermediate the bar and from thereon extending generally downwardly and outwardly, a combing means of substantial breadth horizontally disposed about the first bar, a second bar of general A-frame shape secured at one end to an intermediate position of the first bar and mounted at the other end to said header member and extending generally upwardly and forwardly therefrom, thereby forming a V at the intersection of the first bar with the second bar; a shearing bar mounted to said divider means outwardly adjacent the V; a rotary cutting means operatively mounted outwardly and adjacent to said shear bar; and means for driving said rotary cutting means; whereby the first bar of the divider means converges a portion of the crop situated just outside the path of the header member into the path of the sickle means and furtherly guides other portions of the crop situated about the fringe of said header member path over the combing means where the crop is parted and separated and moreover that crop that is not completely separated by the combing means is trapped in the V formed by the intersection of the first and second bar where it is finally separated by the cutting action of said rotary cutting means cooperating with said shearing bar.

2. A rotary cutting device for a crop harvesting machine as described in claim 1 including a skid member fixedly attached at one end to said header member and extending forwardly therefrom and supportedly braced about its forward portions to the first bar.

3. A rotary cutting device for a crop harvesting machine comprising in combination: a header member having a horizontal sickle means extending thereacross forwardly of said harvesting machine; a divider means mounted generally to one side of said header member and extending forwardly therefrom, said divider means including first and second guard elements which intersect to form a V, said first guard element including a bar having combing means of substantial breadth horizontally disposed thereon and extending forwardly and downwardly and slightly outwardly from the apex of the V, the second guard element extending forwardly and upwardly from the apex of the V; a shearing surface fixedly disposed adjacent said divider means; a rotary cutting means operatively mounted adjacent said shearing surface; and means for driving said rotary cutting means, whereby the first guard element of said divider means first converges the crop situated just outside the path of said header member into the path of the sickle means and secondly guides the crop upward into the V where the crop is separated by the cutting action of said rotary cutting means in cooperation with said shearing surface.

References Cited

UNITED STATES PATENTS

| 94,871 | 9/1869 | Connel | 56—314X |
| 1,616,430 | 2/1927 | Methner | 56—314 |
| 2,686,396 | 8/1954 | Hill et al. | 56—314X |
| 2,688,226 | 9/1954 | Kittelson | 56—314X |
| 2,701,434 | 2/1955 | Christopherson | 56—23X |
| 1,710,611 | 4/1929 | Duncan | 56—17 |
| 1,741,938 | 12/1929 | Holtz | 56—102 |
| 2,154,588 | 4/1939 | Stopher | 56—315 |
| 2,627,156 | 2/1953 | Carter | 56—295 |

RUSSELL R. KINSEY, Primary Examiner